United States Patent [19]

Lostak et al.

[11] Patent Number: 5,240,527

[45] Date of Patent: Aug. 31, 1993

[54] METHOD OF PRODUCING ENCAPSULATED FIBROUS INSULATION BLANKET

[75] Inventors: Charles Lostak, Littleton; Spencer I. Meier, Parker, both of Colo.

[73] Assignee: Schuller International, Inc., Denver, Colo.

[21] Appl. No.: 839,654

[22] Filed: Feb. 20, 1992

[51] Int. Cl.$^5$ .................................................. B32B 31/00
[52] U.S. Cl. .................................... 156/62.4; 156/62.2; 156/167; 156/202; 156/324; 65/4.4
[58] Field of Search .............................. 65/4.4, 8.6, 7; 156/62.2, 167, 62.4, 296, 324, 202, 204; 428/357.4, 198

[56] References Cited

U.S. PATENT DOCUMENTS

| | | | |
|---|---|---|---|
| 1,336,403 | 4/1920 | Weiss | 156/62.2 X |
| 1,956,091 | 4/1934 | Carson | |
| 2,826,236 | 3/1958 | Meauzé et al. | 156/324 |
| 3,144,376 | 8/1964 | Plumberg et al. | 156/62.4 X |
| 3,276,928 | 10/1966 | Pearson et al. | 65/4.4 |
| 3,850,601 | 11/1974 | Stapleford | 65/4.4 X |
| 4,348,248 | 9/1982 | Poncet | 156/62.4 X |

FOREIGN PATENT DOCUMENTS 1309929 10/1962 France .................................. 156/202

*Primary Examiner*—Jeff H. Aftergut
*Attorney, Agent, or Firm*—Cornelius P. Quinn

[57] ABSTRACT

A method of manufacturing a fiber glass blanket encapsulated within an air-permeable sheet on one major face and a non-porous film extending over the other major face and the two side edges. The film is applied by being wrapped around the edges of the backed blanket and preferably being heat sealed to the backing sheet. The air-permeable sheet is preferably applied to the blanket before curing of the binder in the blanket, and in a preferred method the glass fibers are deposited directly on the sheet while the sheet is supported on a collection chain.

12 Claims, 4 Drawing Sheets

METHOD OF PRODUCING ENCAPSULATED FIBROUS INSULATION BLANKET

FIELD OF THE INVENTION

This invention relates to fibrous insulation material. More particularly, it relates to a method of producing an encapsulated glass fiber insulation blanket.

BACKGROUND OF THE INVENTION

Fibrous insulation products are available in various densities for use in a variety of different environments. One such product is a lightweight glass fiber blanket used to insulated structure which requires a high degree of insulation, such as aircraft hulls. In such an environment it is important that the weight be minimal, so as not to add unnecessarily to the weight of the aircraft, and that the blanket be capable of providing an effective barrier to the high sound levels and cold temperatures encountered during flight.

Typical products utilized for this purpose are comprised of fine glass fibers bonded together in blanket form and having a density of about 0.3 pound per cubic foot (pcf) to 1.5 pcf. Depending on the dimensions of the space required to be insulated, either a single blanket or several stacked blankets are wrapped and secured within a film, as by sewing or heat sealing, and the wrapped insulation is then attached to the aircraft fuselage by pins connected to the skin of the aircraft. While such products perform their insulating function satisfactorily, their relatively low tensile strength offers little resistance to stresses encountered during fabrication and installation. Handling of the individual layers and fabrication of the multi-layered product subject the material to additional stresses which tend to damage the weak fiber glass material.

In addition, because the commercial product usually requires an outer film to allow the insulating blanket to be handled and installed as desired, the effectiveness of the insulation will be reduced in service if condensation of water vapor is trapped within the insulation by the film.

It has been suggested to replace the conventional insulation product discussed above with a lightweight fiber glass insulation blanket having an air-permeable backing sheet adhered to one of the major faces of the blanket, with the other major face and the elongated edges of the blanket being encapsulated within a non-porous film or other material such as the porous backing material itself. The backing improves the tensile strength of the insulation product and increases its stiffness. Further, its permeability permits the free passage of air in and out of the blanket. This in turn allows the evaporation of any moisture from installed insulation, such as would be encountered in an aircraft installation, when the insulation is installed with the facing material facing the passenger side of the aircraft.

Such a product could of course be fabricated by the installer of the insulation by separately purchasing the fiber glass blanket, the permeable backing sheet and the non-porous film and attaching the backing and facing materials to the blanket. It would, however, be much preferable to the installer to purchase a fully formed product ready for use directly from the fiber glass producer. This in turn requires the fiber glass producer to be able to rapidly and economically mass produce such an encapsulated product without the need for large capital expenditures. Such a manufacturing process must further be capable of operating at the speed at which the fiber glass blanket is manufactured so as not to require slowing the rate of production of the fiber glass itself.

BRIEF SUMMARY OF THE INVENTION

In accordance with the invention, a blanket comprised of glass fibers bonded together by binder is formed and a backing sheet is bonded to a major face of the blanket. The blanket is continuously moved through a facing application station, the lower face of the blanket being the face to which the backing sheet is bonded. A web of facing material is continuously applied to the upper major face of the blanket at the facing application station, the width of the web being greater than the width of the blanket by an amount such that the web extends down over the side edges of the blanket beyond the lower major face. The portions of the web extending beyond the lower major face are continuously brought into contact with the backing sheet to overlap the backing sheet adjacent the side edges of the blanket, and the overlapping portions of the web are adhered to the blanket. Preferably, the overlapping portions of the film and backing sheet are adhered by heat sealing the film to the backing sheet. For example, impulse heat welding could be employed.

The permeable backing sheet may be adhered to the blanket in any of several ways. The preferred method takes advantage of the fiber glass blanket forming apparatus which employs a moving permeable collection surface, such as a belt or chain, on which a mixture of glass fibers and unbonded binder is collected. According to the invention a web of the air-permeable backing sheet material is provided on the collection surface, enabling suction applied beneath the collection surface to facilitate collecting the fibers on the backing sheet web. Upon curing of the binder, the fibers are bonded together and the web of backing material is bonded to the face of the blanket.

Alternately, a web of backing sheet material is continuously applied to the upper major face of the blanket, preferably before the blanket moves through &:he curing oven, and the blanket is then inverted to enable it to move through the facing application station.

The invention permits encapsulation of very lightweight fiber glass blankets without damaging the integrity of the blanket. It can be appreciated that encapsulation of such fragile material demands sensitive handling while still being able to apply sufficient force in order to satisfactorily adhere the web materials to the blanket.

These and other features and aspects of the invention, as well as their benefits, will be made more clear in the following detailed description of the preferred embodiments.

BRIEF DESCRIPTION OF THE DRAWING

FIG. 8 is a partial schematic representation of a modified portion of the apparatus of FIG. 1, showing the introduction of a top facing web to the insulation product;

DETAILED DESCRIPTION OF THE PREFERRED EMBODIMENTS

Figure 1:
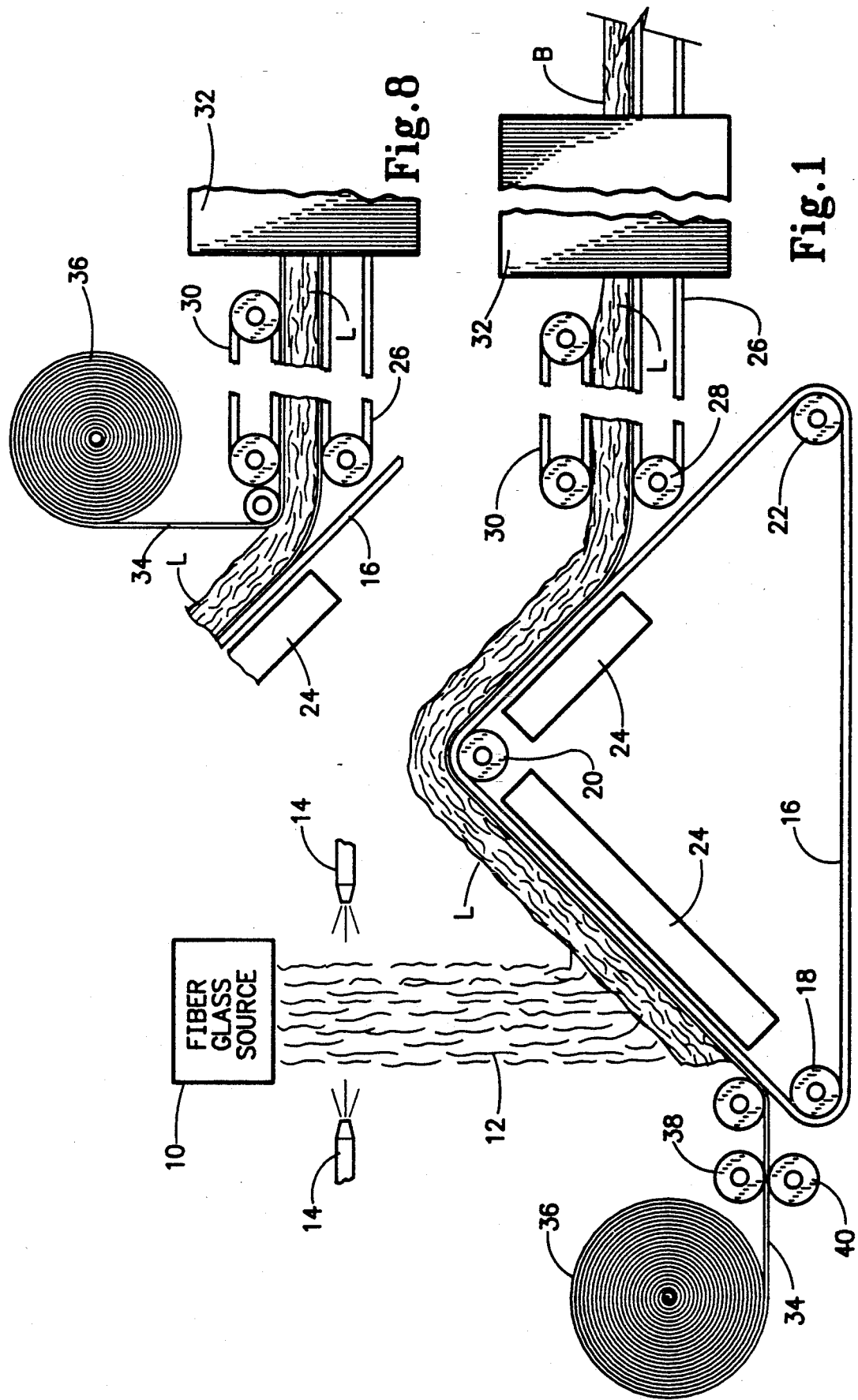
FIG. 1 is a schematic representation of a preferred method employed to produce a fiber glass insulation blanket with a backing sheet adhered to a major face thereof.

Referring to FIG. 1, which illustrated the preferred method of manufacturing the backed blanket of the invention, a source 10 supplies glass fibers 12, which are sprayed with binder by nozzles 14 as the fibers travel toward a moving screen 16. The source may be of any desired type, such as a rotary spinner, into which molten glass is introduced and which upon rapidly rotating causes the molten glass to exit under centrifugal force through small holes in the side walls, resulting in the formation of fibers. A so-called "pot and marble" or flame attenuated process could also be used, wherein marbles or pellets of glass are melted in a pot and the molten glass is drawn from the pot through bushings in the form of fibers.

Whether one of these processes or a different process is the source of the fibers, a fiber glass blanket is normally produced by directing a stream of air-entrained fibers against the moving screen 16. The moving screen, which is known in the art as a collection chain, is typically an open-weave endless metallic conveyor trained about rollers 18, 20 and 22. Suction is created within the path of the collection chain by any suitable means, as by suction boxes 24 mounted directly beneath the collection chain in the upward and downward runs between the roller 20 and the rollers 1B and 22. The vacuum or negative pressure in the collection chamber in which the collection chain runs causes the air stream carrying the fibers to pass through the collection chain. Because the openings in the chain are small enough to filter out most of the fibers contacting it, the fibers so filtered are deposited on the chain and are able to support the fibers which are deposited on them. In so doing, a fiber glass layer of predetermined weight or thickness is built up. It will be understood that the rate of fiber production, the type of fibers produced and the speed of the collection chain are all correlated to provide control over the weight and thickness of the layer.

The manufacturing process typically includes an endless conveyor 26 trained about a roller 28 located near the collection chain 16. The fibrous layer is transferred from the collection chain to the conveyor 26 and may be further contacted on its upper surface by an upper conveyor 30 arranged so that the space between conveyors 30 and 26 just prior to entering oven 32 corresponds to the desired final thickness of the blanket. The layer may also be compressed by conveyors or rollers inside the oven, not shown, to the final desired thickness. The heat in the oven cures the binder on the fibers, and the cured binder holds the fibers in place.

In accordance with the preferred method of applying the permeable backing material to a face of the blanket, a web of air-permeable material 34 is drawn from a roll 36 by rollers 38 and 40 and is directed to the upward run of the collection chain 16. The pressure differential existing on opposite sides of the collection chain causes the web 34 to contact and be supported by the collection chain. Because the web material is highly permeable, the air stream carrying the fibers is able to pass through the web, depositing the fibers directly onto the web. The web thus in effect functions as the outer surface of the collection chain, moving in unison with it.

As shown in FIG. 1, the fibers have built up on the outer surface of the web 34 to form a layer L while the web is supported by the collection chain 16. When the fibrous layer is stripped from the collection chain in transferring to the conveyor 26, the web of permeable material is stripped along with it, so that the fibrous layer L and the web 34 are fed as a unit to the oven 32. There, the curing of the binder results not only in the fibers being bonded to one another, but in the fibers being bonded to the web 34 as well. The finished blanket B is shown exiting from the oven 32.

Figure 2:
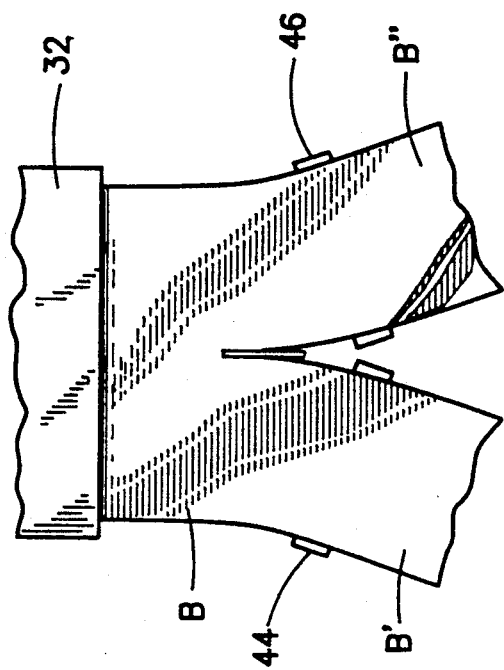
FIG. 2 is a partial schematic plan view of a slitting operation performed on the blanket as it emerges from the binder curing oven.

Typically, the collection chain and oven are wider than the desired width of the blanket. If that is the case, the blanket will be slit to the desired width, a:: by the slitter 42 in FIG. 2. Any suitable means, such as angled conveyors 44 and 46, may be employed to direct the resulting blankets B' and B" onto diverging paths. It will be understood that the apparatus shown in FIG. 2 is for illustrative purposes only, and that more than one slitter may be provided if necessary.

Figure 3:
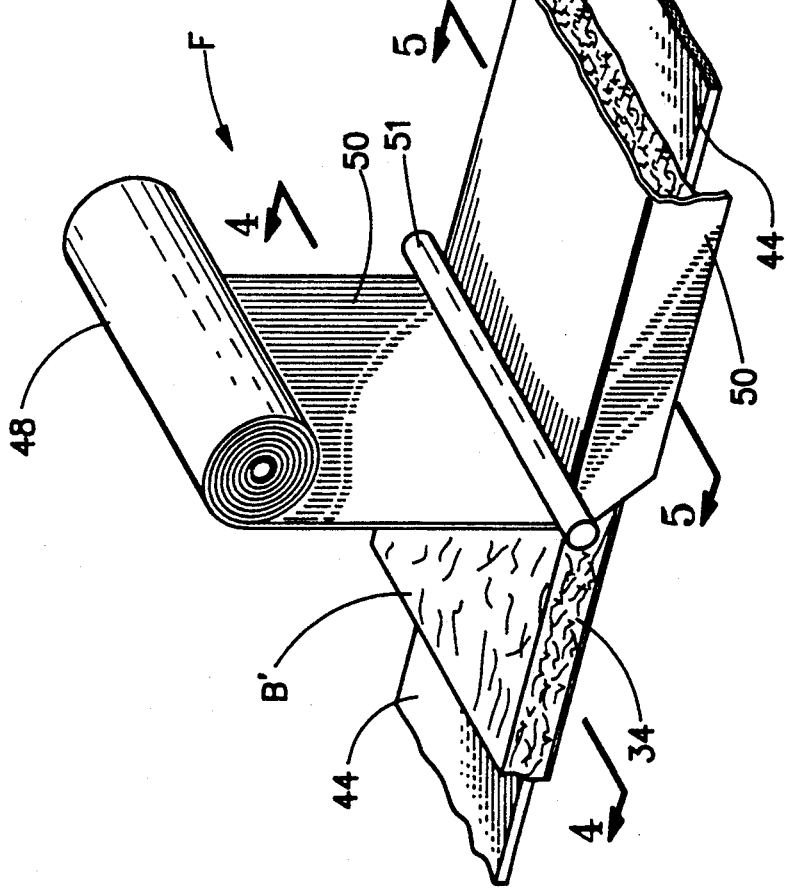
FIG. 3 is a partial pictorial view of the facing operation of the invention.
Figure 4:
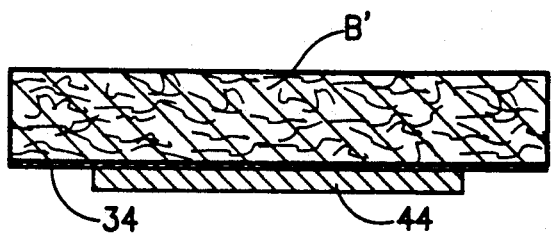
FIG. 4 is an enlarged transverse sectional view taken on line 4—4 of FIG. 3.

Referring to FIG. 3, the blanket is conveyed from the oven to a downstream facing station F. Although either the entire blanket B or one of the smaller size blankets resulting from the slitting operation could be fed to the facing station, depending on the desired width of the finished product, for convenience it will be assumed that the blanket has been slit and the portion passing through the facing station is the blanket B' As shown in FIG. 4, the interim product as it approaches the facing station comprises the blanket B', the bottom face of which is adhered to the backing material 34.

Figure 5:
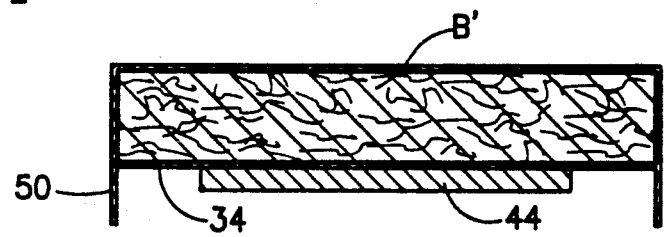
FIG. 5 is an enlarged transverse sectional view taken on line 5—5 of FIG. 3.

The facing station may consist of any convenient arrangement for applying facing material to the blanket. As illustrated, it comprises a roll 48 of facing material 50 overlying the moving blanket. Facing material is drawn from the roll in the form of a web which passed beneath guide roll 51 adjacent the upper surface of the blanket. The length of the roll and the width of the web of facing material are greater than the width of the blanket, so that the web of facing material overhangs the upper surface of the blanket. This is illustrated in FIG. 5, which shows the web 50 draped down over the side edges of the blanket B' and extending below the lower surface of the blanket.

Figure 6:
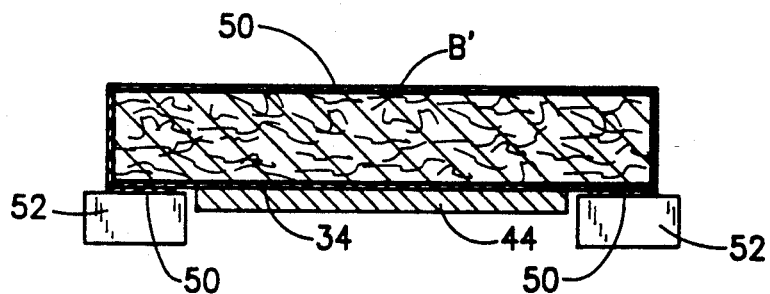
FIG. 6 is an enlarged transverse sectional view taken on line 6—6 of FIG. 3.
Figure 7:
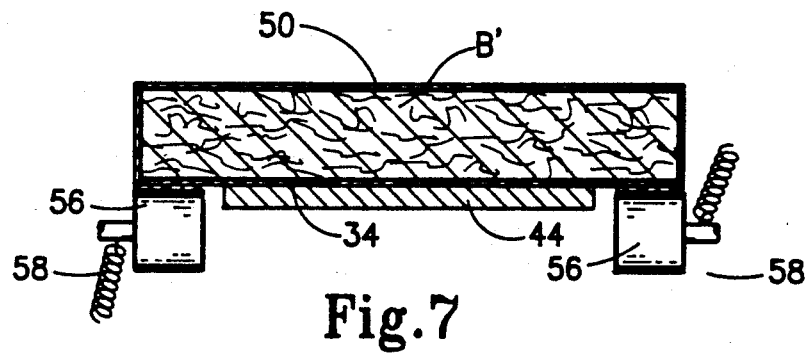
FIG. 7 is an enlarged transverse sectional view taken on line 7—7 of FIG. 3.

Downstream of the facing station are stationary folding shoes 52 positioned in the path of the draped edge portions of the facing web. As is well known in the folding art, the shoes are tapered so that each draped edge portion of the web is progressively folded in as the blanket and web move past the shoes until the edges of the web are completely folded as shown in FIG. 6. Immediately downstream of the folding shoes are one or more rollers 54, 56 which press the folded margins of the web firmly up against the bottom surface of the backing sheet 34. The web margins are then adhered to the underside of the backing sheet, preferably by impulse type heat sealing. As illustrated in FIGS. 3 and 7, coils 58 connected to the downstream rollers 56 indicate that the rollers 56 are heated so as to soften the web material to the point where it adheres to the backing sheet 34. Obviously, other means for heating the web material could be employed if desired.

Note that the conveyor 44 which moves the blanket through the apparatus is narrower than the width of the blanket. This is illustrated in FIGS. 4–7, wherein the edges of the conveyor 44 are spaced from the edge of the blanket a sufficient amount to provide room for the folding shoes 52 and the pressing and heating rollers 54, 56, and for the edge portions of the web to be folded up against the bottom surface of the backing sheet 34.

If the method of applying a backing sheet to the underside of a layer of fiber glass described in connection with FIG. is not employed, the backing sheet may be applied instead to the upper surface of the fiber glass layer in the manner illustrated in FIG. 8. The fiber glass layer in this case is collected directly on the collection chain 16 and a web of the backing material 34 is applied to the upper surface of the layer L from the roll 36 upstream from the oven 32 and the upper press conveyor 30. As in the method of FIG. 1, the curing of the binder in the layer will cause the fibers to be bonded together and the backing material 34 to be bonded to the upper surface of the resulting blanket.

Figure 9:
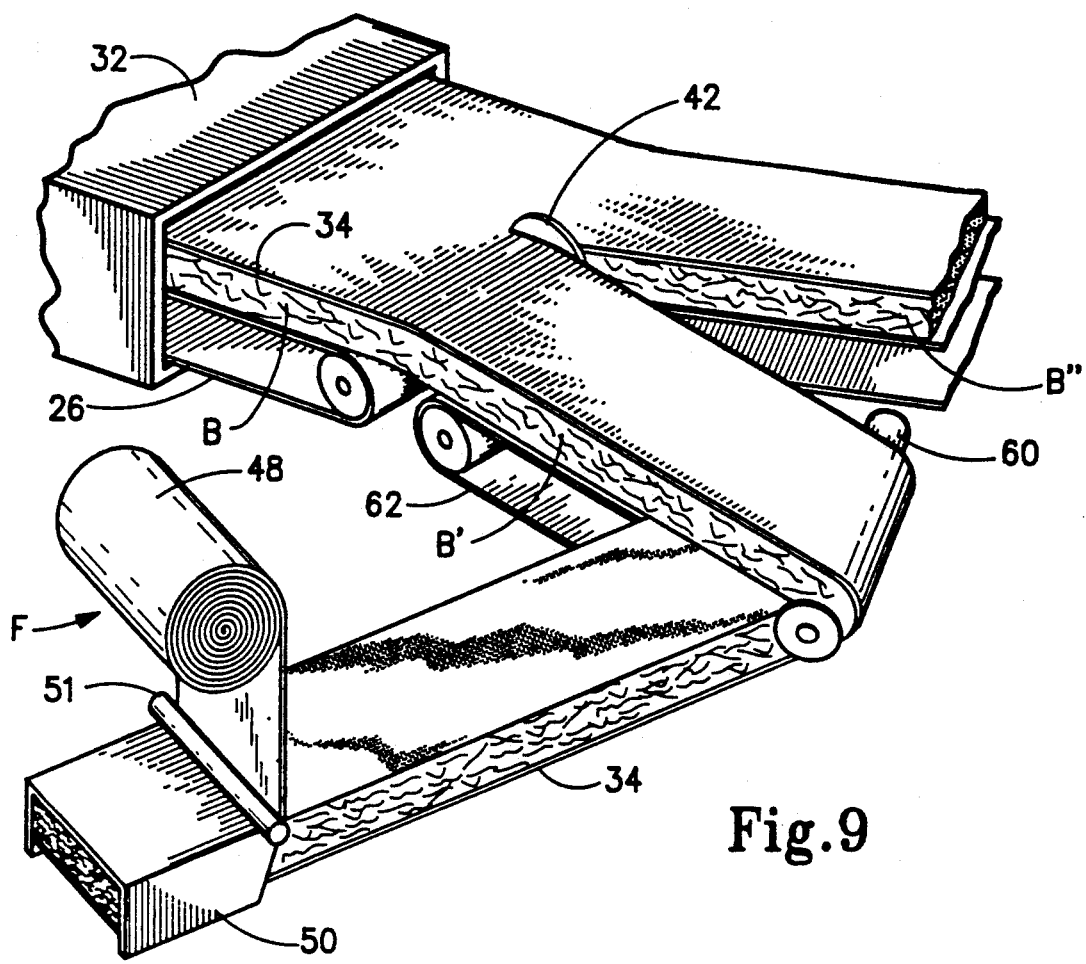
FIG. 9 is a partial pictorial view of apparatus for inverting a blanket prior to the facing operation.

When the backing sheet is applied to the upper surface of the fiber glass layer, it is necessary to invert the blanket downstream of the oven in order to present the blanket to the facing station with the backing side down. Any suitable inverting means may be employed. For purpose of illustration, the blanket B' in FIG. 9 is inverted by angled roll 60 positioned downstream from the conveyor 62, following which the blanket is moved toward the facing station F by the conveyor 44 located at a lower level than the conveyor 62.

Figure 10:
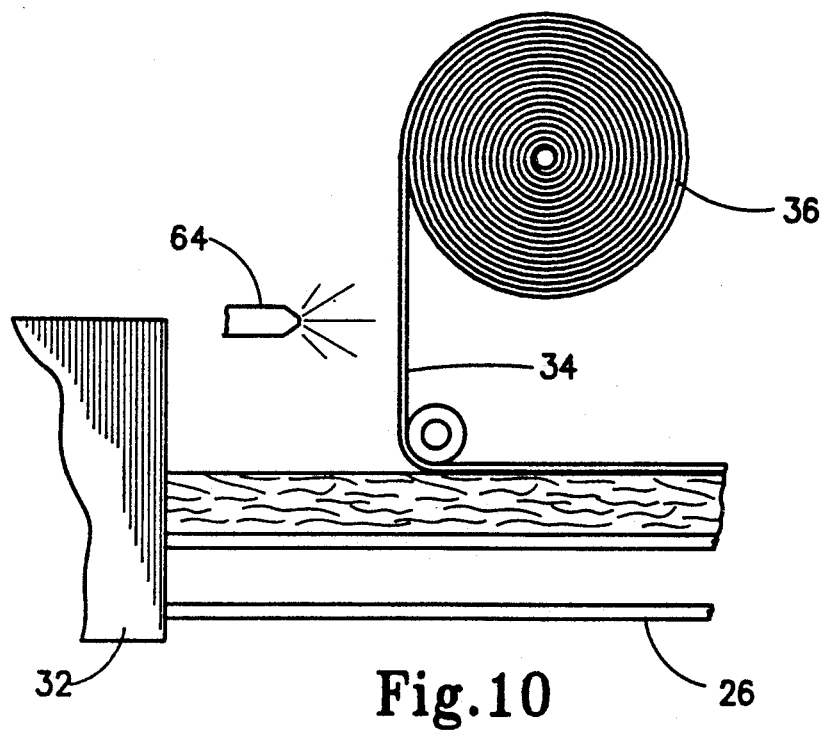
FIG. 10 is a partial schematic representation of a backing web application means located downstream from the curing oven.

If desired, the backing sheet may be applied at a point downstream instead of upstream from the oven. This is illustrated in FIG. 10, wherein the web of sleet material 34 is drawn from the roll 36 in the same manner as in FIG. 8, but in addition receives a spray of adhesive from nozzle 64 in order to adhere the web to the blanket. In such an arrangement the resulting faced sheet would of course have to be inverted as previously discussed.

As shown in FIG. 7, the product resulting from the described process is a lightly compressed blanket B of bonded fibers, a backing sheet 34 of permeable material bonded to a major face of the blanket, and a non-porous film wrapped around the opposite major face and the two side edges of the blanket and bonded to the edge portions of the backing sheet. This leaves only the transverse edges created when the blanket is cut to length for the customer to encapsulate.

Although the backing material has to be sufficiently permeable so as not to impede the flow of air through the collection chain during the manufacturing process or through the facing sheet of the installed faced insulating blanket product, it should also be capable of adding to the tensile strength of the final product and should have sufficient strength to remain intact during the fiber collection process. A sheet capable of functioning in the manner described should be porous, strong, tear resistant and lightweight, for example, less than 1.5 ounces per square yard. Generally, it can be any porous woven or nonwoven scrim or reinforcement media, composed of organic or inorganic fibers with a flame retardant system meeting the flammability requirements of 49 CFR part 25 (FAR 25.853) or BMS 8-142 and the smoke toxicity requirements of FAR 25.853 and ATS 1000.001. The air permeability of the backing sheet should be such that air can pass through one square foot of material at a rate in the range of 500–1000 cubic feet per minute, as measured in accordance with the Frazer Air Permeability Test (ASTM D 737-1982). In addition, the backing sheet material should be heat sealable to the film used to encapsulate the upper face and longitudinal edges of the blanket. An example of such a material is polyester scrim available from Snow Filtration Company and sold under the name "Reemay."

The film material may comprise any of the conventional non-porous films currently used in the installation of insulation blankets in aircraft. One example is a film comprised of Orcon, available from Orcon Corporation. The film employed must be capable of being heat sealed.

Figure 11:
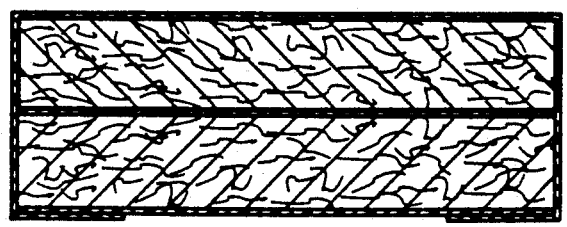
FIG. 11 is a transverse sectional view of a modified insulation product comprised of a plurality of stacked blankets encapsulated within backing and facing sheets, each blanket being similar to the blanket shown in FIG. 5.

The invention is not limited to a single layer of blanket as disclosed thus far, but may comprise a plurality of stacked layers of blanket. As shown in FIG. 11, two layers of overlying backed blankets B' and B'' are encapsulated by film 50 in the same manner as previously described, with the ends of the film being adhered to the backing sheet adjacent the edges of the blanket. The process of manufacture of such a product is carried out in the same manner as in the single layer product, except that another blanket is deposited on top of the first blanket prior to reaching the facing station. This can be carried out by any convenient means, such as by causing the blankets B'' shown in FIGS. 2 and 9 to be deposited or top of blanket B' or by introducing another blanket. Obviously the latter would be done if the blanket exiting from the oven were the full width.

It will be recognized that the invention provides an economical method of producing an improved insulation product which does not require extensive changes or additions to the basic fiber glass production line and does not slow the rate of fiber glass production.

It should now be apparent that the invention need not necessarily be limited to all the specific details described in connection with the preferred embodiments, but that changes to specific features of the preferred embodiments which do not alter the overall basic function and concept of the invention may be made without departing from the spirit and scope of the invention defined in the claims.

What is claimed is:

1. A method of producing a fiber glass insulation blanket having a backing sheet on a major face thereof and a facing sheet on the opposite major face and side edges, comprising the steps of:
   forming a blanket comprised of glass fibers bonded together by binder;
   adhering a backing sheet which is permeable to air to a major face of the blanket;
   continuously moving the blanket, with the backing sheet facing down, through a facing application station;
   continuously applying a web of nonporous facing material to the upper major face of the blanket at the facing application station, the width of the web being greater than the width of the blanket by an amount such that the web extends down over the side edges of the blanket beyond the lower major face;

continuously folding the portions of the web extending beyond the lower major face into contact with the backing sheet to overlap the same adjacent the side edges of the blanket; and adhering the overlapping portions of the web to the backing sheet.

2. The method of claim 1, wherein the facing material is a non-porous film and the overlapping portions of the film and backing sheet are adhered by heat sealing the film to the backing sheet.

3. The method of claim 2, wherein the overlapping portions of the web are folded up against the backing sheet by stationary folding plows.

4. The method of claim 2, wherein heated rollers are used to press the overlapped portions of the film against the backing sheet and to heat seal the same to the film.

5. The method of claim 1, wherein the blanket is formed by collecting a mixture of glass fibers and unbonded binder on a moving air-permeable support surface covered by a web of the backing sheet material, applying suction through the permeable support surface and the web of backing material to facilitate collection of the glass fibers, and curing the binder, the cured binder bonding the fibers together and adhering the web of backing material to the blanket.

6. The method of claim 1, wherein a web of backing sheet material is continuously applied to the upper major face of the blanket, the method including the step of inverting the blanket prior to moving the blanket through the facing application station.

7. The method of claim 6, wherein the web of backing sheet material is applied prior to curing the binder, subsequent curing of the binder adhering the backing sheet material to the blanket.

8. The method of claim 1, wherein the backing sheet is a porous woven or nonwoven scrim.

9. The method of claim 8, wherein the scrim is comprised of polyester.

10. The method of claim 1, wherein the blanket has a density in the range of 0.2 pound per cubic foot to 1.5 pounds per cubic foot, and the thickness of the blanket is in the range of ⅜ inch to 2 inches.

11. The method of claim 1, wherein the blanket to which the web of facing material is adhered is the lower blanket in a plurality of stacked blankets.

12. The method of claim 1, including the step of slitting the continuously moving blanket into webs of lesser width and separating the resulting narrower blankets prior to applying the facing material.

* * * * *